United States Patent [19]

Shimai et al.

[11] Patent Number: 4,799,601

[45] Date of Patent: Jan. 24, 1989

[54] TRANSLUSENT ALUMINA CERAMIC TUBE AND A PROCESS FOR MAKING SAME

[75] Inventors: Shunzo Shimai; Yoshio Saito; Yawara Ando; Takashi Koseki, all of Togane, Japan

[73] Assignee: Toshiba Ceramics Co., Ltd., Japan

[21] Appl. No.: 483,697

[22] Filed: Apr. 11, 1983

[30] Foreign Application Priority Data

Apr. 26, 1982 [JP] Japan .................. 57-68665

[51] Int. Cl.$^4$ .............................................. C04B 35/64
[52] U.S. Cl. .................................. 220/21 R; 264/1.2; 313/317; 501/153
[58] Field of Search .................... 220/2.1 R, 2.2; 264/1.2; 501/153

[56] References Cited

U.S. PATENT DOCUMENTS

| | | | |
|---|---|---|---|
| 1,906,602 | 5/1933 | Hull | 220/2.1 R X |
| 2,030,397 | 2/1936 | Reynolds | 220/453 X |
| 2,032,945 | 3/1936 | Marden | 220/2.1 R X |
| 2,096,084 | 10/1937 | Birdseye | 220/2.1 R |
| 2,172,839 | 9/1939 | Francis | 220/2.1 R X |
| 2,420,311 | 5/1947 | Gowell | 220/2.1 R X |
| 3,330,892 | 7/1967 | Herrmann | 501/153 X |
| 3,377,176 | 4/1968 | Wolkodoff et al. | |
| 3,379,543 | 4/1968 | Norwalk | 501/153 X |
| 3,466,488 | 9/1969 | Evans et al. | 220/2.1 R X |
| 3,533,827 | 10/1970 | Rimbach | 220/2.1 R |
| 3,557,991 | 1/1971 | Wittek | 220/2.1 R |
| 3,846,146 | 11/1974 | Hunting et al. | |
| 3,885,181 | 5/1975 | Nelson et al. | 220/2.1 R X |
| 4,004,173 | 1/1977 | Rigden | 220/2.1 R X |
| 4,193,857 | 3/1980 | Bannister | 264/63 |
| 4,222,978 | 9/1980 | Oda et al. | 220/2.1 R X |
| 4,320,074 | 3/1982 | Birchall et al. | 264/63 |
| 4,373,030 | 2/1983 | Kaneno et al. | 220/2.1 R X |
| 4,387,067 | 6/1983 | Kobayashi et al. | 264/1.2 X |
| 4,451,418 | 5/1984 | Furuta et al. | 264/63 |

FOREIGN PATENT DOCUMENTS 95870  6/1982  Japan .................. 501/153

OTHER PUBLICATIONS

Resin Review, vol. XI, No. 1, 1961, Rohm and Haas Co., "Acrylic Polymers and Wetting Agents in Ceramic".

Primary Examiner—Henry J. Recla
Assistant Examiner—Robert Petrik
Attorney, Agent, or Firm—Lorusso & Loud

[57] ABSTRACT

The disclosed process includes making a slip or slurry by mixing alumina powder, water, a deflocculant and a magnesium compound, casting the slip or slurry by drain casting and thereafter firing or sintering same. A coagulant is used as the deflocculant.

A tube for a lamp, which is a unitary body of translucent alumina ceramic, has a large-diameter portion located at a central portion of the tube and two small-diameter portions located at both end portions of the tube. The tube is produced by drain casting. The tube has substantially the same wall thickness over its whole length. The inner surface of the tube is more smooth than its outer surface.

6 Claims, 2 Drawing Sheets ns
TRANSLUSENT ALUMINA CERAMIC TUBE AND A PROCESS FOR MAKING SAME

BACKGROUND OF THE INVENTION

This invention relates to a translucent or light-transmissive, alumina ceramic tube and to a method for producing the same.

Translucent alumina ceramic is frequently used as envelopes or tubes for high pressure sodium lamps. It is chemically stable, has high mechanical strength, and exhibits excellent electrical and thermal characteristics.

Because of those favorable properties, translucent alumina ceramic has various usages. However, more versatility in forms or shapes would broaden its utility.

Conventionally, translucent alumina cermic has been shaped by such methods as isostatic pressing, extrusion molding and dry pressing. Consequently, its shapes have been limited to such simple ones as tubes, plates and flanged plates. With such molding methods as heretofore employed, it has been difficult to produce a tube having a diameter differing along its length For example, high pressure sodium lamps are difficult to seal. It is desirable, therefore, that they should have smaller diameters at the end portions to be sealed, than at the central portion. It is difficult to make the conventional tubes having such shapes by isostatic pressing, extrusion or dry pressing.

Also the envelopes or tubes for metal halide lamps are preferably made of translucent alumina ceramic, rather than conventionally employed fused quartz. A favorable shape of tube for metal halide lamp, however, is that inflated at a central portion, not a straight tube, because of the normal behaviour of an arc. Conventional methods for shapinng translucent alumina ceramic again fail to provide a product of such a configuration.

Slip casting is desirable for producing varieties in the shapes of translucent alumina ceramic. However, the following problems are encountered in attempting to apply slip casting to the production of alumina ceramic shapes:

(1) The starting material for translucent alumina ceramic is alumina powder of particles which have extremely small diameters, even the largest not exceeding 1 $\mu$m. In the process of making a slip or slurry of such ultra-fine powder, it is difficult to reduce the amount of the liquid media (normally water).

Consequently the density of the cast pieces becomes low. It renders the subsequent firing or sintering of the translucent alumina ceramic difficult, so that only a porous product is produced.

(2) It order for a translucent alumina to retain sufficient transmissivity, the starting alumina powder must have a purity not lower than 99.9%. This requirement severely limits the type and amount of additives which may be used for making the casting slip or slurry.

(3) A deflocccculant must be added to the slip or slurry of alumina powder. The theories on the function of the defloccculant have been based on the casting of conventional ceramics.

Casting of conventional ceramics has mostly been practiced with clay-containing systems. Thus, conventional theories on the function of the deflocculant are not applicable to a system using ultrafine powders such as alumina powder.

Again, sodium-containing compounds have been mainly used as deflocculants in the casting of ceramics free of clay, such as water glass, sodium humate, sodium alginate and PVA. Those deflocculants, however, cannot be used for the shaping of translucent alumina ceramic.

The addition of the deflocculant in the amount of 0.05–0.3% by weight, based on the powder of the deflocculant has been recommended. That amount of deflocculant, however, has been determined for powders of normal particle sizes, and does not relate to on the use of an ultrafine powder which has a drastically increased specific surface area.

Thus, the amount of deflocculant which should be added to the alumina powder was not previously clear.

(4) Prior to shaping the translucent alumina ceramic a, grain growth inhibiter is mixed into the slip or slurry. Magnesium compounds have been used for this purpose.

A magnesium compound, however, releases magnesium ions as it is dissolved in water. A substantial amount of magnesium ions act to raise viscosity of the slip or slurry, working together with the deflocculant.

When the slip or slurry viscosity increases, the solids content of the slip or slurry must be reduced. Consequently a larger amount of the deflocculant must be used to form a slip or slurry of high solids content, which is apt to result, however, in the cracking of the shaped and fired product.

SUMMARY OF THE INVENTION

The object of the present invention is to provide an improved translucent alumina ceramic tube and a method for making same in various shapes.

DETAILED DESCRIPTION

Figure 1:
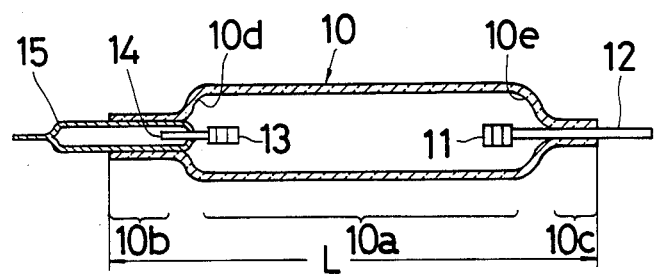
FIG. 1 is a sectional view showing a tube for a lamp according to this invention.

The process according to this invention comprises making a slip or slurry by mixing alumina powder, water, a defloculant and a magnesium compound, casting the slip or slurry by drain casting and thereafter firing or sintering the same.

In the subject process, a deflocculant selected from among the compounds which have heretofore been used as coagulants is used, as the deflocculant.

The coagulant may be organic or inorganic, provided that it is free from metal ions other than aluminous ions, or does not contain aluminous ions.

Examples of useful organic coagulants include polyacrylamides, ammonium polyacrylates, ammonium salts of carboxymethyl cellulose, polyethyleneimine and polyvinylpyridine.

A specific example of the inorganic coagulant is poly aluminium chloride.

A suitable amount of the coagulant ranges from 0.05–10% based on the alumina powder, the percentages appearing in this specification all being by weight. When the amount of the coagulant added is less than the above, deflocculation of the powder is insufficient, and the solids content of the slip or slurry becomes so low that the translucent alumina ceramic made from the slip cannot have high density as sintered or fired pieces. The powder particles having large specific surface areas, however, can provide translucent alumina ceramics, even with the addition of a minor amount of the defloculant, if their sintering activity is relatively high. The particles with small specific surface areas cannot give the intended translucent alumina ceramic, unless they are perfectly deflocculated to raise the concentration of solid components in the slip.

If too great an amount of the coagulant is added, the shaped articles tend to show cracks.

If an organic coagulant is used as the deflocculant, the formed pieces separated from the mold must then be fired or calcined in an oxidizing or oxygen-containing atmosphere, so that the organic coagulant may be burned off. The preferred calcination temperature ranges from 800° to 1500° C.

A slip composed solely of inorganic matters needs not be calcined. The dried formed piece is then fired or sintered at a high temperature as is, either in a hydrogen atmosphere or in vacuum. The preferred sintering temperature ranges from 1700° to 1950° C.

The starting alumina powder preferably has a specific surface area of from 1.5 $m^2/g$ to 100 $m^2/g$. If the area is greater than 100 $m^2/g$, the solids content of the slip is not sufficiently raised, and consequently the sintered piece fails to become translucent. This is because the greater portion of the powder is not completely converted to α-alumina.

When the specific surface area of the alumina powder is less than 1.5 $m^2/g$, the solids content of the slip can be high, but the sintered piece contains pores, consequently showing a low transmissivity. This is because the activity level of the powders is insufficient for providing a perfect sintered body of density.

The purity of the alumina powder is preferably more than 99.9%.

The preferred amount of the magnesium compound to be added is, if calculated as magnesia, 0.01–0.2% to the alumina powder. The less the addition of the magnesium compound, within the above-specified range, the better becomes the quality of the sintered piece.

When the amount of the magnesium compound added, calculated as magnesia, is less than 0.01%, localized exaggerated grain growth tends to occur, which decreases the strength of the translucent alumina product.

If the ratio exceeds 0.2%, spinel crystals are formed at the edges of grain boundaries of the ceramic, which impair the light transmissivity of the translucent alumina ceramic product.

The magnesium compound preferably has the minimum possible solubility which desirably is not higher than 0.03.

As the magnesium compound, for example, magnesium phosphate, magnesium alminium spinel, magnesium hydroxide and magnesium oxide can be favorably used. Also magnesium fluoride, magnesium carbonate and magnesium hydroxycarbonate may be used.

If magnesium oxalate or ammonium magnesium phosphate is employed, a large amount of deflocculant must be used for attaining equivalent a slip or slurry viscosity equivalent to those obtainable with other magnesium compounds. The subsequently shaped piece as well as the sintered piece, therefore, is apt to produce cracks.

The water content of the slip preferably ranges from 10 to 50%.

If the inner surface roughness of a translucent alumina ceramic in a tube shape is more smooth than the outer surface thereof, before and after chemical-polishing, excellent performance as a lamp tube can be obtained.

Hereinafter the present invention will be further explained referring to working examples, in which all parts are by weight.

EXAMPLE 1

(A) Translucent or light-transmissive alumina porcelain pieces were produced as follows, using a deflocculant in an amount varied for each run.

As the magnesium compound, magnesium phasphate [$Mg(PO_4)_2 8H_2O$] was used. The blend ratio of the alumina powder, deionized water and magnesium phaspate was as below.

| | |
|---|---|
| Alumina powder | 100 parts |
| Deionized water | 18 parts |
| Magnesium phasphate | 0.3 parts |

To the above blend, polyacrylamide was added as the deflocculant, in amount varied for each run as follows: 0.1, 0.5, 2.5, 10 and 50 parts. The alumina powder had a purity of 99.95%, and a specific surface area of 5 $m_2/g$.

As the result, when 0.1 part of polyacrylamide was added, the resultant mixture was not flowable.

When the amount of polyacrylamide was 0.5 part or greater, the mixture became a slip or slurry which was moldable.

Each slip was shaped by drain casting, using a gypsum mold. Thus cast piece was 30 mm in outer diameter, 30 mm in length and 1 mm in thickness and had a tubular shape.

The cast piece was separated from the mold and allowed to stand until fully dried, and thereafter fired or sintered in an air atmosphere for 2 hours, followed by a further 3 hours sintering at 1900° C. in vacuum.

As a result, the fired piece to which 50 parts of polyacrylamide had been added was heavily cracked. The piece to which 10 parts of polyacrylamide had been added had one crack, while those pieces prepared with the addition of 0.5 part and 2.5 parts of polyacrylamide, respectively, were excellent, showing no cracking at all. All of the fired pieces were semi-transparent in appearance, and were made of translucent or light-transmissive alumina ceramic.

(B) Similar experiments were run, changing the deflocculant from polyacrylamide to aluminium polychloride but with all other conditions unchanged from those described in the above-stated experiments (A).

As the result, the Mixture containing 0.1 part of poly aluminum chloride could form a slip or slurry, unlike the case with polyacrylamide.

Thus, when poly aluminum chloride was used as the deflocculant, its amount of addition could be varied from 0.1 part to 10 parts without any cracking of the sintered pieces.

EXAMPLE 2

Translucent alumina pieces were produced from alumina powders of various specific surface areas.

Alumina powders having specific surface areas of, respectively, 150, 100, 50, 10, 3 and 1.5 m²/g were used for making translucent alumina ceramic. All the powders had a purity of 99.9%. To each alumina powder, ammonium polyacrylate was added at a ratio of $4 \times 10^{-4}$ g/m².

Each of the alumina powder-ammonium polyacrylate mixtures was formed into a slip or slurry having a viscosity of 5 poises, with the addition of deionized water. The amount of the water required for each case is given in Table 1 below. The results given in Table 1 demonstrate that as the alumina powder becomes finer, a greater amount of deionized water is necessary to form a casting slip.

Then 0.2 part of aluminium magnesium spinel was added to each slip. Subsequently each slip was drain-cast, using gypsum molds each 10 mm in inner diameter and 150 mm in length. Each cast piece obtained was, therefore, a tube of 10 mm in outer diameter, 1 mm in thickness and 150 mm in length.

The pieces were demolded, completely dried and calcined in an air atmosphere at 1200° C. for an hour. Thereafter they were sintered in a hydrogen atmosphere at 1800° C. for 3 hours.

The total light transmittance and mechanical bending srength of the produced tubes were measured, with the results as given in the Table 2 below.

The results indicate that when the alumina powder has a specific surface area of 150 m²/g, the tube is opaque and non-transparent. The tube also was deformed. Whereas, the tubes prepared from the alumina powders having the specific surface areas ranging from 100 m²/g to 3 m²/g were composed of translucent alumina, and were excellent. When the alumina powder having a specific surface area of 1.5 m²/g was used, however, the tube was slightly opacified.

(B) The above steps were repeated, using the same starting materials, except that the ammonium polyacrylate as the deflocculant was replaced by poly aluminum chloride which was added to each alumina powder at a ratio of $1 \times 10^{-4}$ g/m².

The experiments prove that results equivalent to those of the above stated experiments (A) can be obtained with the use of poly aluminum chloride as the deflocculant.

EXAMPLE 3

Translucent alumina ceramic were prepared. The purity of the alumina powder, type of the magnesium compound and the sintering temperature varied for each run.

The alumina powders had purities of, respectively, 99.8%, 99.9% and 99.99%. All the alumina powders had specific surface areas of 25 m²/g.

As the magnesium compound, magnesium phosphate, magnesium hydroxycarbonate and magnesium oxalate were used.

Ammonium polyacrylate was used as the deflocculant. The blend ratio of each alumina powder with the deionized water, ammonium polyacrylate and the magnesium compound was as follows:

| | |
|---|---|
| Alumina powder | 100 parts |
| Deionized water | 50 parts |
| Ammonium polyacrylate ($4 \times 10^{-4}$ g/m²) | 1 part |
| Magnesium compound (calculated as magnesia) | 0.02 part |

The slips formed were measured of their viscosities, with the results as shown in the later-appearing Table 3.

The slip or slurry containing magnesium oxalate could not be shaped by drain casting, but could be shaped by solid casting.

(A) Each slip or slurry was dropped onto a gypsum board and shaped into a disc having a diameter of about 50 mm and a thickness of 5 mm, which was dried thoroughly, fired in an air atmosphere at 800° C., and further fired or sintered in vacuum for 5 hours, at various temperatures of 1700° C., 1800° C., 1900° C. and 1950° C.

The thus sintered discs were measured for their apparent densities. Also their appearances were observed. The results were as given in the later-appearing Table 4.

(B) Deionized water was added to each slip to adjust its viscosity to about 4 poises. Then the slip or slurry was poured into a gypsum mold and shaped by drain casting. The mold had an inner diameter of 10 mm and a length of 150 mm. Thus cast piece was a 1 mm-thick tube. The tubes were calcined, and sintered at various temperatures as specified in (A) above.

The total light transmittance of the sintered tubes was measured, with the results as shown in Table 4.

The above-stated process is applicable to the production of other fine ceramic materials, for example, high density zirconia ceramics or spinel ceramics.

According to the above-stated process, translucent alumina ceramic tubes can be produced by drain casting. The process therefore allows the production of such ceramics of many and versatile shapes, such as straight tubes. Particularly the translucent alumina ceramic tubes proved to be highly advantageous as special tubes for lamps.

EXAMPLE 4

The blend ratio of the alumina powder, deionized water and magnesium phasphate was as below.

| | |
|---|---|
| Alumina powder | 100 parts |
| Deionized water | 18 parts |
| Magnesium phasphate | 0.3 parts |

To the above blend, 0.5 polyacrylamide was added as the deflocculant. The alumina powder had a purity of 99.95%, and a specific surface area of 5 m₂/g. The viscosity of the slip was 5 poise.

When the amount of polyacrylamide was 0.5 part, the mixture formed a slip which was moldable. Each slip was shaped by drain casting, using a gypsum mold.

As shown in FIG. 1, a ceramic tube for a lamp was shaped by drain casting. A centrally located large-diameter portion 10a of the tube has an outer diameter of 13 mm. Small diameter portions 10b, 10c at the end portions thereof have outer diameters of 9 mm. The full length L is 157 mm.

The thus shaped piece was fired at 900° C. for 2 hours. Thereafter, the fired piece was cut and then the thickness thereof was measured as 1 mm±0.05 mm at several portions of the tube.

On the other hand, the above fired or sintered piece which was not cut was worked so as to change the thickness thereof and then further fired at 1800° C. for 10 hours within a hydrogen atmosphere so that a translucent alumina ceramic tube was produced. As a result, the outer diameter of the large-diameter portion of the tube was 9.5 mm, the inner diameter thereof 8 mm, the outer diameter of the small-diameter portions 5.7 mm, the inner diameter 4.2 mm, and the whole length 114 mm.

The lamp tube 10 has the straight large-diameter portion 10a and the small-diameter portions 10b, 10c at the ends thereof. The lamp tube 10 has substantially the same thickness over the whole length. The inner walls 10d, 10e at the connecting portions between the large-diameter portion 10a and the small-diameter portions 10b 10c are gradually curved, for example, having a radius R of 0.5 mm or more.

Reference numerals 11 and 13 designate electrodes. The electrode 11 is fixed to the small-diameter portion 10c of the lamp tube 10 by way of the retaining rod 12. The electrode 13 is fixed to the niobium exhaust tube 15 which in turn is fixed to the small diameter portion 10b of the luminous tube 10.

High-pressure sodium lamps employed with the above lamp tube 10 were tested convertability to lamps, transmissivity efficiency and life time. The test results are shown in Table 5. In Table 5, "o" shows that a lamp can be produced, and "x" shows that it cannot be produced.

Figure 2:
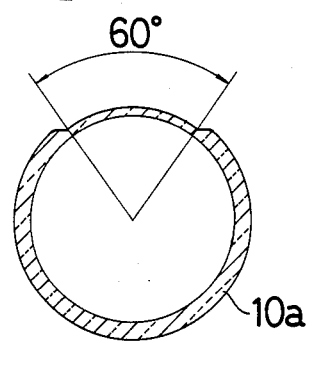
FIG. 2 is a cross-sectonal view showing a comparison model (samples 1–4, table 5), i.e. a tube in which a portion thereof is scraped off so as to decrease the thickness.

As can be seen from Sample Nos. 1 to 4 in Table 5, when the large diameter portion 20a of the same type lamp tube (a comparison model) is worked thin through an angle of 60°, as shown in FIG. 2, the tube thickness thereby varies and the lamp life time decreases. Also, when the small diameter portion is worked in the same way, the lamp life time is decreased as can be seen from Sample Nos. 5 to 8.

Figure 3:
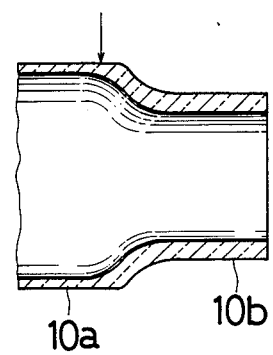
FIG. 3 is a vertical sectional view showing a comparison model (samples 9–12, table 5), i.e. a tube for a lamp in which a large-diameter portion thereof is scraped off so as to decrease the thickness.

If the large diameter portion 30a of a similar lamp tube is worked thin as shown in FIG. 3, as can be seen from Sample Nos. 9 to 12, the transmissivity efficiency decreases.

Figure 4:
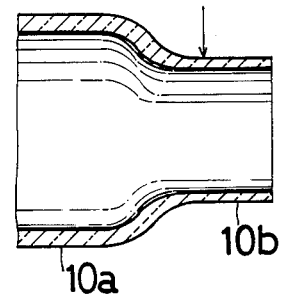
FIG. 4 is a vertical sectional view showing a comparison model (samples 13–16, table 5), i.e. a tube for a lamp in which a small-diameter portion thereof is scraped off so as to decrease the thickness.

On the contrary, if the small-diameter portion 40b of a similar lamp tube is worked thin as shown in FIG. 4, as can be seen from Sample Nos. 13 to 16, the lamp life time decreases. In particular, if the decreasing ratio in thickness is more than 50%, the lamp life time remarkably decreases.

When the lamp tube 10 is formed as one piece or body and has small diameter portions at both ends thereof as in the shown embodiment, only a small amount of frit is required, which increases lamp life time.

EXAMPLE 5

Figure 5:
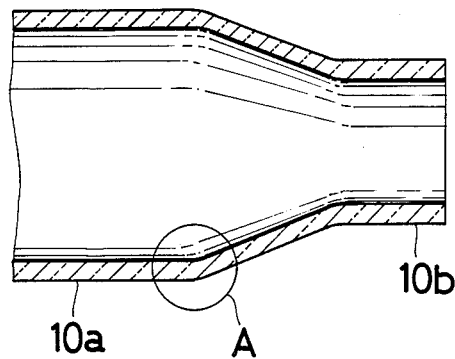
FIG. 5 is a sectional view showing a translucent alumina tube for a lamp according to this invention.
Figure 6:
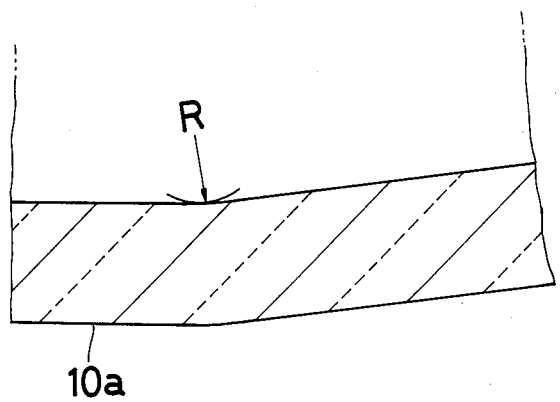
FIG. 6 is an enlarged sectional view of the portion encircled by A in FIG. 5.

Alumina tubes having a small-diameter portion at ends thereof were produced by drain casting in the same manner as in Example 1. The water content of the slip and the gypsum mold was varied for each run, so that the speed of the build-up of the cast layer on the mold was varied. As the result, various curved inner surfaces were formed as designated by the reference R in FIGS. 5 and 6. The cast pieces were provisionally fired in an air atmosphere at 1000° C. for one hour and further fired or sintered in vacuum at 1820° C. for 8 hours thereby to produce translucent alumina tubes. R of each tubes were 0.36 mm, 0.50 mm, 0.57 mm, 0.71 mm, 1.43 mm and 2.14 mm.

Chemical-polishing of the tube is preferable in order to emit effectively light from the tube so as to increase light transmissivity and particularly the in-line transmittance. See for example Japanese Patent Publication No. 57-8069, Patent No. 1116172 entitled "a process for chemical-polishing alumina ceramic."

High-pressure sodium lamps employed with a chemical-polished alumina tube were tested as to transmissivity efficiency and life time. The test reluts are shown in Table 6.

As can be seen from Table 6, when R is 0.36 mm, the high-pressure sodium lamp life time was not enough long. It was also observed that chemical-polishing increased transmissivity efficiency and life time.

EXAMPLE 6

Alumina tubes were produced by drain casting in the same manner as in Example 4 and thereafter fired to become translucent alumina ceramic tubes. Such tubes were further chemical-polished. The roughness of the tubes prior to and after the chemical-polishing step is shown in Table 7. The inner surface of the tubes was more smooth than the outer surface thereof, before and after they were chemical-polished.

In Table 7, Ra designates the average value of 8–10 measurements, and Rmax designates the average value of 10 measurements×0.8 mml.

If the inner surface of the tube is excellently smooth, the light of a light source in a lamp tube can efficiently transmit through the tube because only minor random reflection occurs.

TABLE 1

| Specific surface area ($m^2/g$) | 150 | 100 | 50 | 10 | 3 | 1.5 |
|---|---|---|---|---|---|---|
| Alumina powder (part) | 100 | 100 | 100 | 100 | 100 | 100 |
| Ion-exchange water (part) | 120 | 90 | 60 | 30 | 20 | 18 |

TABLE 2

| Specific surface area of alumina powder ($m^2/g$) | 150 | 100 | 50 | 10 | 3 | 1.5 |
|---|---|---|---|---|---|---|
| Transmissivity of diffused light (%) | 88 | 92 | 94 | 94 | 93 | 89 |
| Bend strength ($Kgf/cm^2$) | 1600 | 1900 | 2300 | 2400 | 2200 | 1800 |

TABLE 3

| Magnesium Compound | Purity of alumina powder (%) | Viscosity of slip (poise) |
|---|---|---|
| Magnesium phosphate | 99.8 | 5 |
|  | 99.9 | 4.5 |
|  | 99.99 | 4.2 |
| Magnesium hydroxy-carbonate | 99.8 | 15 |
|  | 99.9 | 13 |
|  | 9.99 | 12 |
| Magnesium oxalate | 99.8 | non-measurable |
|  | 99.8 | 80 |
|  | 99.99 | 75 |

TABLE 4

| | Magnesium phosphate | | | | |
|---|---|---|---|---|---|
| Alumina purity (%) | Sintering temp. (°C.) | Density ($g/cm^3$) | Transmissivity of diffused light (%) | Appearance observed | |
| 99.8 | 1700 | 3.96 | 85.0 | gray | non- |

TABLE 4-continued

Magnesium phosphate

| Alumina purity (%) | Sintering temp. (°C.) | Density (g/cm³) | Transmissivity of diffused light (%) | Appearance observed | |
|---|---|---|---|---|---|
| | 1800 | 3.97 | 86.0 | gray | translucent translucent |
| | 1900 | 3.97 | 87.0 | " | " |
| | 1950 | 3.96 | 87.0 | " | " partially abnormal particle growth |
| 99.9 | 1700 | 3.975 | 92.0 | slightly white | |
| | 1800 | 3.98 | 92.0 | slightly white | translucent |
| | 1900 | 3.98 | 93.0 | slightly white | " |
| | 1950 | 3.97 | 92.5 | slightly white | " |
| 99.99 | 1700 | 3.98 | 96.0 | slightly white | translucent |
| | 1800 | 3.98 | 96.5 | | excellently translucent |
| | 1900 | 3.98 | 96.5 | | excellently translucent |
| | 1950 | 3.975 | 96.0 | slightly coarse texture | translucent |

Magnesium hydroxy-carbonate

| Alumina purity (%) | Sintering temp. (°C.) | Density (g/cm³) | Total trans-mittance | Appearance observed | |
|---|---|---|---|---|---|
| 99.8 | 1700 | 3.95 | 80.5 | gray | non-transparent |
| | 1800 | 3.96 | 82.5 | " | non-transparent |
| | 1900 | 3.96 | 83.0 | " | non-transparent |
| | 1950 | 3.96 | 83.0 | " | non-transparent |
| 99.9 | 1700 | 3.97 | 91.0 | slightly white | |
| | 1800 | 3.975 | 92.0 | slightly white | translucent |
| | 1900 | 3.975 | 92.0 | slightly white | translucent |
| | 1950 | 3.97 | 9.0 | slightly white | translucent |
| 99.99 | 1700 | 3.98 | 96.0 | slightly white | translucent |
| | 1800 | 3.98 | 96.5 | | excellently translucent |
| | 1900 | 3.98 | 96.5 | slightly white | excellently translucent |
| | 1950 | 3.975 | 95.0 | slightly coarse texture | translucent |

Magnesium oxalate

| Alumina purity (%) | Sintering temp. (°C.) | Density (g/cm³) | Total transmittance | Appearance observed | |
|---|---|---|---|---|---|
| 99.8 | 1700 | 3.88 | 70.0 | gray | non-translucent |
| | 1800 | 3.90 | 75.0 | " | non-translucent |
| | 1900 | 3.90 | 75.0 | " | non-translucent |
| | 1950 | 3.89 | 75.0 | " | non-translucent |
| 99.9 | 1700 | 3.93 | 86.0 | white | non-translucent |
| | 1800 | 3.94 | 87.0 | " | non-translucent |
| | 1900 | 3.94 | 87.0 | " | non-translucent |
| | 1950 | 3.94 | 87.0 | " | non-translucent |
| 99.99 | 1700 | 3.95 | 90.0 | slightly white | translucent |
| | 1800 | 3.96 | 92.0 | slightly white | translucent |
| | 1900 | 3.96 | 92.0 | slightly white | translucent |
| | 1950 | 3.96 | 92.0 | slightly white | translucent |

TABLE 5

Performance of Comparison Model Lamps

| Sample No. | Decrease in Thickness (mm) | Lamp Production | Lamp Efficiency (1/W) | Life Time (KH) |
|---|---|---|---|---|
| 1 | 0.8 | o | 144 | 15 |
| 2 | 0.6 | o | 143 | 12 |
| 3 | 0.5 | o | 144 | 6 |
| 4 | 0.4 | o | 143 | 3 |
| 5 | 0.8 | o | 146 | 18 |
| 6 | 0.6 | o | 145 | 12 |
| 7 | 0.5 | x (partially) | 147 | 2 |
| 8 | 0.4 | x | — | — |
| 9 | 0.8 | o | 140 | 18 |
| 10 | 0.6 | o | 135 | 20 |
| 11 | 0.5 | o | 130 | 12 |
| 12 | 0.4 | o | 120 | 12 |
| 13 | 0.8 | o | 146 | 14 |
| 14 | 0.6 | o | 145 | 13 |
| 15 | 0.5 | o | 148 | 10 |
| 16 | 0.4 | o | 147 | 8 |
| 17 | no work | o | 145 | 20 |

TABLE 6

| | | Sintered Tube | | Chemical-polished Tube | |
|---|---|---|---|---|---|
| Sample No. | R (mm) | Lamp Efficiency (1/W) | Life Time (KH) | Lamp Efficiency (1/W) | Life Time (KH) |
| 1 | 0.36 | 143 | 7 | 150 | 8 |
| 2 | 0.50 | 146 | 12 | 152 | 13 |
| 3 | 0.57 | 148 | 15 | 152 | 15 |
| 4 | 0.71 | 150 | 18 | 155 | 19 |
| 5 | 1.43 | 152 | 21 | 157 | 25 |
| 6 | 2.14 | 153 | 23 | 159 | 27 |

TABLE 7

| Ra(μm) | | Rmax(μm) | |
|---|---|---|---|
| Outer Surface | Inner Surface | Outer Surface | Inner Surface |
| *As a Fired* | | | |
| 2.46 | 1.80 | 6.0 | 4.2 |
| 2.10 | 1.17 | 6.0 | 3.0 |
| 1.59 | 1.14 | 6.0 | 3.6 |
| 1.71 | 1.14 | 6.0 | 3.0 |
| 1.68 | 1.05 | 6.0 | 3.0 |
| 1.92 | 1.53 | 5.4 | 4.8 |
| | | 6.6 | 4.2 |
| | | 5.9 | 4.0 |
| *Chemical-Polished* | | | |
| 1.50 | 1.14 | 4.8 | 4.2 |
| 2.25 | 1.20 | 4.8 | 3.0 |
| 2.04 | 0.96 | 3.0 | 1.8 |
| 2.31 | 1.35 | 3.0 | 1.8 |
| 1.80 | 0.60 | 3.0 | 2.4 |
| 1.65 | 0.66 | 3.0 | 2.4 |
| 1.65 | 1.14 | 3.0 | 2.4 |
| 1.80 | 1.20 | 3.1 | 2.5 |

What is claimed is:

1. A lamp tube comprising: an elongated, tubular monolithic body of translucent alumina ceramic, said elongated tubular body having a central portion and end portions of diameter smaller than said central portion, said tube being produced by drain casting and having substantially the same wall thickness over its entire length.

2. A tube as claimed in claim 1, wherein the radius of curvature of a curved wall between the large-diameter portion and the small-diameter portions is 0.5 mm or more.

3. A tube as claimed in claim 1, wherein the tube is chemical-polished.

4. A tube as claimed in claim 1, wherein the inner surface of the tube is more smooth than the outer surface thereof.

5. The tube of claim 4 wherein the inner and outer surfaces are chemically polished.

6. A lamp tube comprising: an elongated, tubular monolithic body of translucent alumina ceramic, said elongated tubular body having a central portion and end portions of diameter smaller than said central portion, said tube being produced by drain casting and having substantially the same wall thickness over its entire length; a rod mounted within one of said end portions, said rod having a free end extending into said central portion; a first electrode mounted on said free end of said rod; a niobium exhaust tube mounted within the other of said end portions, said exhaust tube having a free end extending into said central portion and a second electrode mounted on said free end of said exhaust tube.

* * * * *

UNITED STATES PATENT AND TRADEMARK OFFICE
CERTIFICATE OF CORRECTION

PATENT NO. : 4,799,601

DATED : January 24, 1989

INVENTOR(S) : SHIMAI et al

It is certified that error appears in the above-identified patent and that said Letters Patent is hereby corrected as shown below:

Col. 1, line 34, "behaviour" should read --behavior--.

Col. 2, line 1, after "clay," insert --i.e. deflocculants--;

line 9, delete "on";

line 63, delete ", as the deflocculant".

Col. 3, line 46, delete "perfect" and after "of" insert --perfect--.

Col. 4, line 5, delete "equivalent";

UNITED STATES PATENT AND TRADEMARK OFFICE
CERTIFICATE OF CORRECTION

PATENT NO. : 4,799,601

DATED : January 24, 1989

INVENTOR(S) : SHIMAI et al.

It is certified that error appears in the above-identified patent and that said Letters Patent is hereby corrected as shown below:

Col. 4, line 35, "amount" should read --amounts--.

Col. 5, line 34, delete "the";
      line 39, delete "the";
      line 55, "ceramic" should read --ceramics--.

Col. 11, line 6, delete "a".

Signed and Sealed this

Twenty-eighth Day of November 1989

*Attest:*

JEFFREY M. SAMUELS

*Attesting Officer*     *Acting Commissioner of Patents and Trademarks*